(12) United States Patent
Sasaki

(10) Patent No.: US 12,513,910 B2
(45) Date of Patent: Dec. 30, 2025

(54) RESERVOIR ELEMENT AND NEUROMORPHIC ELEMENT

(71) Applicant: TDK CORPORATION, Tokyo (JP)

(72) Inventor: Tomoyuki Sasaki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 1281 days.

(21) Appl. No.: 17/281,027

(22) PCT Filed: Nov. 21, 2018

(86) PCT No.: PCT/JP2018/042977
§ 371 (c)(1),
(2) Date: Mar. 29, 2021

(87) PCT Pub. No.: WO2020/105136
PCT Pub. Date: May 28, 2020

(65) Prior Publication Data
US 2021/0351232 A1    Nov. 11, 2021

(51) Int. Cl.
*H10B 61/00* (2023.01)
*G06N 3/04* (2023.01)
*G06N 3/063* (2023.01)
*H10N 50/85* (2023.01)
*H10N 52/00* (2023.01)
*H10N 52/80* (2023.01)

(52) U.S. Cl.
CPC .............. *H10B 61/00* (2023.02); *G06N 3/04* (2013.01); *G06N 3/063* (2013.01); *H10N 50/85* (2023.02); *H10N 52/00* (2023.02); *H10N 52/80* (2023.02)

(58) Field of Classification Search
None
See application file for complete search history.

(56) References Cited

U.S. PATENT DOCUMENTS

| | | | |
|---|---|---|---|
| 8,552,759 B2* | 10/2013 | Wessels | H10B 61/00 326/38 |
| 2003/0161180 A1* | 8/2003 | Bloomquist | G11C 11/1659 365/173 |
| 2005/0002230 A1* | 1/2005 | Hosotani | H10B 61/22 365/171 |
| 2005/0018478 A1* | 1/2005 | Nagase | G11C 11/16 365/171 |
| 2005/0024788 A1* | 2/2005 | Sato | G11B 5/33 360/324 |
| 2008/0017843 A1* | 1/2008 | Kaushal | H10D 30/751 257/14 |

(Continued)

OTHER PUBLICATIONS

Feb. 19, 2019 International Search Report issued in International Patent Application No. PCT/JP2018/042977.

(Continued)

*Primary Examiner* — Bilkis Jahan
(74) *Attorney, Agent, or Firm* — Oliff PLC

(57) ABSTRACT

A reservoir element according to an aspect of the present invention includes a plurality of ferromagnetic layers laminated in a first direction and separated from each other, at least one spin-orbit torque wiring that faces at least one of the plurality of ferromagnetic layers, and a spin transport layer that faces the plurality of ferromagnetic layers, connects at least the two ferromagnetic layers closest to each other among the plurality of ferromagnetic layers and transports spins.

3 Claims, 9 Drawing Sheets

(56) References Cited

U.S. PATENT DOCUMENTS

2012/0211848 A1* 8/2012 Sasaki .................... H10N 50/10
257/422
2019/0385647 A1* 12/2019 Higo .................. G11C 11/5607

OTHER PUBLICATIONS

Torrejon et al.; "Neuromorphic computing with nanoscale spintronic oscillators;" Letter; Nature; vol. 547; pp. 428-432; Jul. 27, 2017.
Sasaki et al.; "Electrical Spin Injection into Sillicon Using MgO Tunnel Barrier;" Applied Physics Express 2; pp. 053003-1-053003-3; 2009.
Sasaki et al.; "Spin transport in non-degenerate Si with a spin MOSFET structure at room temperature;" Physical Review Applied 2; pp. 1-23; 2014.
J.C. Slonczewski; "Current-driven excitation of magnetic multilayers;" Journal of Magnetism and Magnetic Materials; vol. 159; pp. L1-L7; 1996.
Riou et al.; "Neuromorphic Computing through Time-Multiplexing with a Spin-Torque Nano-Oscillator;" pp. IEDM17-804-IEDM17-807; 2017.
Tsunegi et al.; "Scaling up electrically synchronized spin torque oscillator networks;" Scientific Reports; pp. 1-7; Sep. 7, 2018.

* cited by examiner

RESERVOIR ELEMENT AND NEUROMORPHIC ELEMENT

TECHNICAL FIELD

The present invention relates to a reservoir element and a neuromorphic element.

BACKGROUND ART

A neuromorphic element is an element that imitates a human brain by a neural network. The neuromorphic element artificially imitates a relationship between a neuron and a synapse in the human brain.

A hierarchical type element is one neuromorphic element. The hierarchical type element has chips (neurons in the brain) located in a hierarchical form, and transmission unit (synapses in the brain) configured to connect them. The hierarchical type element increases a percentage of correct answers to a question when the transmission unit (synapses) perform learning. Learning is finding knowledge that can be used in the future from information, and the neuromorphic element weights the input data. The hierarchical type element performs learning in each hierarchy.

However, the learning in each hierarchy becomes a heavy burden on circuit design and causes an increase in power consumption of the neuromorphic element when the number of chips (neurons) is increased. A reservoir computer is being studied as a way to reduce this burden.

The reservoir computer is one neuromorphic element. The reservoir computer includes a reservoir element and an output part. The reservoir element is constituted by a plurality of chips that interact with each other. The plurality of chips interact with each other according to input signals, and output signals. A transmission unit that connects the plurality of chips has a fixed weight and does not perform learning. The output part learns the signals from the reservoir element and outputs the signals to the outside. The reservoir computer enhances a percentage of correct answers to questions by compressing the data with the reservoir element and weighting the data in the output part. The learning in the reservoir computer is performed only in the output part. The reservoir computer is expected to be a unit that enables simplification of circuit design of neuromorphic elements and ameliorating power consumption.

Non-patent Literature 1 discloses a neuromorphic element using a spin torque oscillation (STO) element as a chip (neuron).

CITATION LIST

Non Patent Literature

[Non Patent Literature 1]
Jacob Torrejon et al., Nature, Vol. 547, pp. 428-432 (2017)

SUMMARY OF INVENTION

Technical Problem

However, in a neuromorphic element using STO elements as chips, it is necessary to align the resonance frequencies of the STO elements. The resonance frequency of an STO element varies due to manufacturing errors or the like, and STO elements may not interact with each other properly. In addition, an STO element is oscillated by applying a high-frequency current in a lamination direction. Applying a high-frequency current in the lamination direction of an STO element including an insulating layer for a long time may cause failure of the STO element.

In consideration of the above-mentioned circumstances, the present invention provides a reservoir element and a neuromorphic element that operate stably.

Solution to Problem

In order to solving the above-mentioned problems, the present invention provides the following means.

(1) A reservoir element according to a first aspect includes a plurality of ferromagnetic layers laminated in a first direction and separated from each other; at least one spin-orbit torque wiring that faces at least one of the plurality of ferromagnetic layers; and a spin transport layer that faces the plurality of ferromagnetic layers, connects at least the two ferromagnetic layers closest to each other among the plurality of ferromagnetic layers and transports spins.

(2) The reservoir element according to the above-mentioned aspect may further include a gate electrode facing the spin transport layer and located between the plurality of ferromagnetic layers.

(3) In the reservoir element according to the above-mentioned aspect, the at least one spin-orbit torque wiring may include a plurality of spin-orbit torque wirings, and each of the spin-orbit torque wirings may be connected to each of the ferromagnetic layers.

(4) In the reservoir element according to the above-mentioned aspect, the spin-orbit torque wiring may be connected to two or more ferromagnetic layers of the plurality of ferromagnetic layers.

(5) In the reservoir element according to the above-mentioned aspect, the plurality of ferromagnetic layers may be located in a one-dimensional array on a first surface intersecting the first direction.

(6) In the reservoir element according to the above-mentioned aspect, the plurality of ferromagnetic layers may be located in a two-dimensional array on a first surface intersecting the first direction.

(7) In the reservoir element according to the above-mentioned aspect, the spin transport layers may form a lattice, and each of the ferromagnetic layers may face positions of intersections of the lattice of the spin transport layers.

(8) In the reservoir element according to the above-mentioned aspect, a plurality of spin transport layers may be provided, a first spin transport layer may face a ferromagnetic layer located at a first height position in the first direction, a second spin transport layer may face a ferromagnetic layer located at a second height position in the first direction, and the first spin transport layer and the second spin transport layer may be connected to each other via a spin via wiring that transports spins.

(9) In the reservoir element according to the above-mentioned aspect, the spin transport layer may include any one metal or an alloy selected from the group consisting of Cu, Ag, Al, Mg, and Zn.

(10) In the reservoir element according to the above-mentioned aspect, the spin transport layer may include any one element or compound selected from the group consisting of Si, Ge, GaAs, and C.

(11) A neuromorphic element according to a second aspect includes the reservoir element according to the above-mentioned aspect; an input part connected to the reservoir element; and an output part connected to the reservoir element and configured to learn a signal from the reservoir element.

Advantageous Effects of Invention

A reservoir element and a neuromorphic element according to the embodiments can be stably operated.

DESCRIPTION OF EMBODIMENTS

Figure 1:
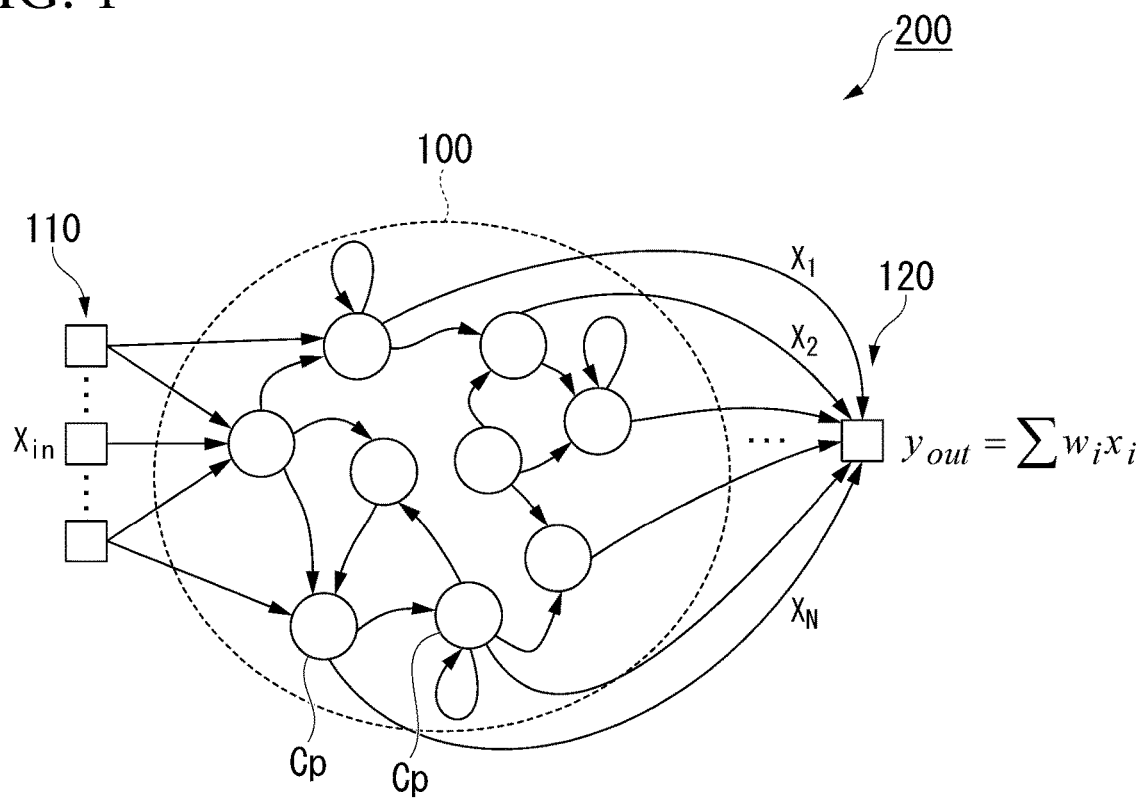
FIG. 1 is a conceptual view of a neuromorphic element according to a first embodiment.

Hereinafter, embodiments of the present invention will be described with reference to the accompanying drawings in detail. In the drawings used in the following description, feature portions may be enlarged for convenience to make features easier to understand, and dimensional ratios of components may be different from the actual ones. Materials, dimensions, and the like, exemplified in the following description are examples, and the present invention is not limited to them and may be appropriately modified and realized within the range in which effects of the present invention are exhibited.

First Embodiment (Neuromorphic Element)

FIG. 1 is a conceptual view of a neuromorphic element according to a first embodiment. A neuromorphic element 200 has an input part 110, a reservoir element 100 and an output part 120. The input part 110 and the output part 120 are connected to the reservoir element 100.

The neuromorphic element 200 compresses the signal input from the input part 110 using the reservoir element 100, performs weighting (learning) on the signal compressed by the output part 120, and outputs the signal to the outside.

The input part 110 transmits the signal input from the outside to the reservoir element 100. The input part 110 includes, for example, a plurality of sensors. The plurality of sensors detect information outside the neuromorphic element 200, and input the information to the reservoir element 100 as a signal. As the signal, a change in information in the outside may be continuously input to the reservoir element 100 over time, or may be divided by predetermined time-domain and input to the reservoir element 100.

The reservoir element 100 has a plurality of chips Cp. The plurality of chips Cp interact with each other. The signal input to the reservoir element 100 has a plurality of pieces of information. The plurality of pieces of information held by the signal is compressed into required information by interaction of the plurality of chips Cp. The compressed signal is transmitted to the output part 120. The reservoir element 100 does not perform learning. That is, the plurality of chips Cp only interact with each other, and the signals transmitted between the plurality of chips Cp are not weighted.

The output part 120 receives signals from the chips Cp of the reservoir element 100. The output part 120 performs learning. The output part 120 performs weighting according to the learning for the signal from each of the chips Cp. The output part 120 includes, for example, a non-volatile memory. The non-volatile memory is, for example, a magnetoresistance effect element. The output part 120 outputs the signal outside of the neuromorphic element 200.

The neuromorphic element 200 compresses data using the reservoir element 100 and enhances a percentage of correct answers to questions by weighting the data using the output part 120.

In addition, the neuromorphic element 200 has excellent power consumption. The learning in the neuromorphic element 200 is performed by only the output part 120. The learning is to adjust the weight of the signal transmitted from each of the chips Cp. The weight of the signal is determined according to an importance of the signal. When the weight of the signal is adjusted at any time, a circuit between the chips Cp becomes active. As the number of active circuits is increased, power consumption of the neuromorphic element 200 is increased. The neuromorphic element 200 only needs to learn the output part 120 in the final stage and has an excellent power consumption.

Figure 2:
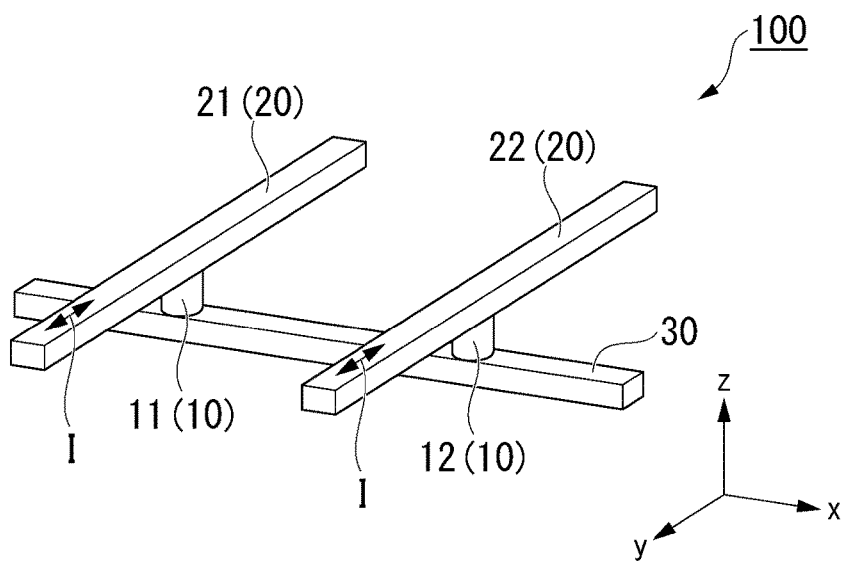
FIG. 2 is a perspective view of a reservoir element according to the first embodiment.

FIG. 2 is a perspective view of the reservoir element 100 according to the first embodiment.

First, directions will be defined. A direction in which ferromagnetic layers 10 (to be described below) are laminated is referred to as a z-direction, a direction of a surface perpendicular to the z-direction is referred to as an x-direction, and a direction perpendicular to the z-direction and the x-direction is referred to as the y-direction. The z-direction is an example of a first direction. An x-y plane is an example of a first surface.

(Reservoir Element)

The reservoir element 100 includes a plurality of ferromagnetic layers 10, a spin-orbit torque wiring 20 and a spin transport layer 30. The ferromagnetic layers 10 shown in FIG. 2 correspond to the chips Cp shown in FIG. 1. The spin transport layer 30 shown in FIG. 2 corresponds to a transmission unit that connects the chips Cp in FIG. 1.

"Ferromagnetic Layer"

The reservoir element 100 has the plurality of ferromagnetic layers 10. For example, the reservoir element 100 includes a first ferromagnetic layer 11 and a second ferromagnetic layer 12. Hereinafter, when the first ferromagnetic layer 11 and the second ferromagnetic layer 12 are not distinguished from each other, they may be simply referred to as the ferromagnetic layers 10.

The first ferromagnetic layer 11 and the second ferromagnetic layer 12 are separated from each other. Neighboring ferromagnetic layers 10 are insulated by, for example, an interlayer insulating film. The first ferromagnetic layer 11 and the second ferromagnetic layer 12 are arranged one-dimensionally in the x-direction. In the specification, "arranged one-dimensionally" means that the ferromagnetic layers are arranged in one direction and lines connecting the ferromagnetic layers are aligned in one direction (for example, in the x-direction).

A shape of each of the ferromagnetic layers 10 is, for example, a columnar shape. The shape of the ferromagnetic layer 10 is not limited to a columnar shape. The shape of the ferromagnetic layer 10 may be, for example, an elliptical column, a square column, a cone, an elliptical cone, a truncated cone, a quadrangular pyramid, or the like.

The ferromagnetic layers 10 include ferromagnetic substances. The ferromagnetic layers 10 include, for example, a metal selected from the group consisting of Cr, Mn, Co, Fe and Ni, alloys including one or more of these metals, or alloys including these metals and at least one element of B, C, and N. The ferromagnetic layers 10 are, for example, Co—Fe, Co—Fe—B, Ni—Fe, a Co—Ho alloy ($CoHo_2$), and a Sm—Fe alloy ($SmFe_{12}$).

The ferromagnetic layers 10 have magnetization. The magnetization may be a perpendicular orientation which is oriented in the z-direction or may be in-plane orientation which is oriented in a direction in the x-y plane. The magnetization is oscillated by spins supplied from the spin-orbit torque wiring 20.

"Spin-Orbit Torque Wiring"

The reservoir element 100 has the spin-orbit torque wiring 20. The reservoir element 100 has, for example, a first spin-orbit torque wiring 21 and a second spin-orbit torque wiring 22 (see FIG. 2). The spin-orbit torque wiring 20 faces the ferromagnetic layers 10. In the specification, "facing" is not limited to the case in which the two members are in contact with each other and includes the case in which different layers are present between the two members.

The first spin-orbit torque wiring 21 is connected to the first ferromagnetic layer 11, and the second spin-orbit torque wiring 22 is connected to the second ferromagnetic layer 12. In the specification, "connected" means that the spins are connected in a transportable state. For example, even when a layer is provided between the first ferromagnetic layer 11 and the first spin-orbit torque wiring 21, delivery and acceptance of the spins between the first ferromagnetic layer 11 and the first spin-orbit torque wiring 21 may be possible.

The spin-orbit torque wiring 20 extends in a direction intersecting the ferromagnetic layers 10. For example, the first spin-orbit torque wiring 21 and the second spin-orbit torque wiring 22 extend in the y-direction.

The spin-orbit torque wiring 20 produces spin currents by a spin Hall effect when a current I flows. The spin Hall effect is a phenomenon that the spin currents are induced in a direction perpendicular to a flow direction of the current I based on the spin orbit interaction when the current I flows.

When a potential difference is provided between both ends of the spin-orbit torque wiring 20, the current I flows along the spin-orbit torque wiring 20. A first spin oriented in one direction and a second spin oriented in a direction opposite to the first spin are bent in a direction perpendicular to the current. For example, the first spin oriented in the −x-direction may be bent in the −z-direction, and the second spin oriented in the +x-direction may be bent in the +z-direction.

A conventional Hall effect and a spin Hall effect are the same in that moving (moving) charges (electrons) are bent in a motion (moving) direction. In the normal Hall effect, the charged particles moving in the magnetic field receive a Lorentz force and the motion direction is bent, whereas in the spin Hall effect, the major difference is that the moving direction of the spins is bent due to movement of electrons (due to a current flowing) in the absence of a magnetic field.

In a non-magnetic substance, the number of electrons of the first spin and the electron number of the second spin generated by the spin Hall effect are equal to each other. The electron number of the first spin oriented in the −z-direction is equal to the electron number of the second spin oriented in the +z-direction. In this case, flows of the charges cancel each other out, and the amount of current becomes zero. The spin currents without the electric current are particularly referred to as pure spin currents. Provided that a flow of the electrons of the first spin is expressed as $J_\uparrow$, a flow of the electrons of the second spin is expressed as $J_\downarrow$, and the spin current is expressed as $J_S$, $J_S = J_\uparrow - J_\downarrow$ is defined. The spin current $J_S$ is generated in the z-direction.

The spin-orbit torque wiring 20 faces the ferromagnetic layers 10. The spins are injected into the ferromagnetic layers 10 from the spin-orbit torque wiring 20. The injected spins provide a spin-orbit torque (SOT) to the magnetization of the ferromagnetic layers 10. The magnetization of the ferromagnetic layers 10 is oscillated by the spin-orbit torque (SOT). The magnetization of the first ferromagnetic layer 11 is oscillated by receiving the spin-orbit torque (SOT) due to the spins injected from the first spin-orbit torque wiring 21. The magnetization of the second ferromagnetic layer 12 is oscillated by receiving the spin-orbit torque (SOT) due to the spins injected from the second spin-orbit torque wiring 22.

The spin-orbit torque wiring 20 is formed of any one of a metal, an alloy, an intermetallic compound, a metal boride, a metal carbide, a metal silicide, and a metal phosphide having a function of generating spin currents using the spin Hall effect when a current flows.

The spin-orbit torque wiring 20 is preferably mainly composed of a non-magnetic heavy metal. A heavy metal means a metal having a specific gravity equal to or more than that of yttrium. The non-magnetic heavy metal is preferably a non-magnetic metal having a large atomic number in which an atomic number is equal to or greater than 39 and having d electrons or f electrons in the outermost shell. The non-magnetic heavy metal has a large spin orbit interaction that causes a spin Hall effect.

Electrons generally move in a direction opposite to a current regardless of the direction of the spins. On the other hand, a non-magnetic metal with a large atomic number having d electrons or f electrons in the outermost shell has a large spin orbit interaction, and the spin Hall effect is strongly generated. A flow of spins in the z-direction depends on a degree of uneven distribution of the spins in the z-direction. When the spin Hall effect is strongly generated, the spins are likely to be unevenly distributed, and the spin current $J_S$ is likely to occur.

In addition, the spin-orbit torque wiring 20 may include a magnetic metal. The magnetic metal is a ferromagnetic metal or an anti-ferromagnetic metal. A small amount of magnetic metal contained in the non-magnetic substance becomes a cause of scattering of spins. When spins are scattered, the spin orbit interaction is enhanced, and the efficiency of generation of the spin current with respect to the current is increased.

When an adding amount of the magnetic metal is excessively increased, the generated spin currents are scattered by the added magnetic metal, and as a result, the spin currents may be reduced. A molar ratio of the added magnetic metal is preferably sufficiently smaller than a total of the molar ratios of the elements that constitute the spin-orbit torque wiring. The molar ratio of the added magnetic metal is preferably equal to or smaller than 3% of the entirety.

The spin-orbit torque wiring 20 may include a topological insulating substance. A topological insulating substance is a material in which the inside of the material is an insulating substance or a high-resistance substance but a spin-polarized metal state occurs on the surface thereof. In the topological insulating substance, an internal magnetic field is generated due to the spin orbit interaction. In the topological insulating substance, even when an external magnetic field is not provided, a new topological phase appears due to an effect of the spin-orbit interaction. The topological insulating substance can generate pure spin currents with high efficiency due to strong spin orbit interaction and breaking of inversion symmetry at an edge thereof.

The topological insulating substance is, for example, SnTe, $Bi_{1.5}Sb_{0.5}Te_{1.7}Se_{1.3}$, $TlBiSe_2$, $Bi_2Te_3$, $Bi_{1-x}Sb_x$, $(Bi_{1-x}Sb_x)_2Te_3$, or the like. The topological insulating substance can generate the spin currents with high efficiency.

"Spin Transport Layer"

The spin transport layer 30 faces the ferromagnetic layers 10. The spin transport layer 30 connects, for example, the first ferromagnetic layer 11 and the second ferromagnetic layer 12. The first ferromagnetic layer 11 and the second ferromagnetic layer 12 are arranged one-dimensionally in the x-direction, and the spin transport layer 30 that connects them extends in the x-direction.

The spin transport layer 30 is formed of a non-magnetic conductor. The spin transport layer 30 propagates the spin currents extruded from the ferromagnetic layers 10.

The spin transport layer 30 is formed of, for example, a material having a large spin diffusion length and a large spin transport length. The spin diffusion length is a distance until the spins injected into the spin transport layer 30 is diffused and information of the injected spins is halved. The spin transport length is a distance until the spin currents of the spin polarization current flowing through the non-magnetic substance are halved. When the application voltage to the spin transport layer 30 is small, the spin diffusion length and the spin transport length substantially coincide with each other. When the application voltage to the spin transport layer 30 is increased, the spin transport length is greater than the spin diffusion length due to a drift effect.

The spin transport layer 30 connects the two ferromagnetic layers 10 that are closest to each other. A distance between the two neighboring ferromagnetic layers 10 is preferably equal to or smaller than a spin transport length of a material that constitutes the spin transport layer 30, or more preferably equal to or smaller than the spin diffusion length.

The spin transport layer 30 is, for example, a metal or a semiconductor. The metal used in the spin transport layer 30 is, for example, a metal or an alloy containing any element selected from the group consisting of Cu, Ag, Al, Mg and Zn. The semiconductor used in the spin transport layer 30 is, for example, a simple substance or an alloy of any element selected from the group consisting of Si, Ge, GaAs and C. For example, Si, Ge, Si—Ge compound, GaAs, graphene, or the like, is exemplified.

(Method of Manufacturing Reservoir Element)

Next, an example of a method of manufacturing the reservoir element 100 in the neuromorphic element 200 will be described. The reservoir element 100 can be fabricated by combining a film forming method such as sputtering or the like, and a processing method such as photolithography or the like.

First, a substrate (not shown) is prepared. The substrate is, for example, a semiconductor substrate. A substrate Sb is preferably, for example, Si or AlTiC. The Si or AlTiC is easy to obtain a surface with exceptional flatness.

Next, the spin transport layer 30 and the ferromagnetic layers 10 are laminated on a surface of the substrate. The spin transport layer 30 and the ferromagnetic layers 10 are laminated using, for example, a sputtering method or a chemical vapor deposition (CVD) method.

Next, a hard mask is formed at a predetermined position on a surface of the ferromagnetic layers 10. Then, a portion that is not coated with the hard mask is removed through RIE or ion milling. The spin transport layer 30 and the ferromagnetic layers 10 are processed in a predetermined shape by changing a processing direction. Next, surroundings of the spin transport layer 30 and the ferromagnetic layers 10 are coated with an interlayer insulating film.

Next, surfaces of the ferromagnetic layers 10 and interlayer insulating film are flattened through chemical mechanical polishing (CMP). The spin-orbit torque wiring 20 is laminated on the ferromagnetic layers 10 and the interlayer insulating film that are flattened. The spin-orbit torque wiring 20 is laminated using, for example, a sputtering method, a chemical vapor deposition (CVD) method. The reservoir element 100 is obtained by processing the spin-orbit torque wiring 20 in a predetermined shape through photolithography or the like.

(Operation of Reservoir Element)

Next, a function of the reservoir element 100 will be described. A sensor that constitutes the input part 110 is connected to any one of the spin-orbit torque wirings 20. When the sensor receives a signal from the outside, and the current I flows to the corresponding spin-orbit torque wiring 20.

Figure 3:
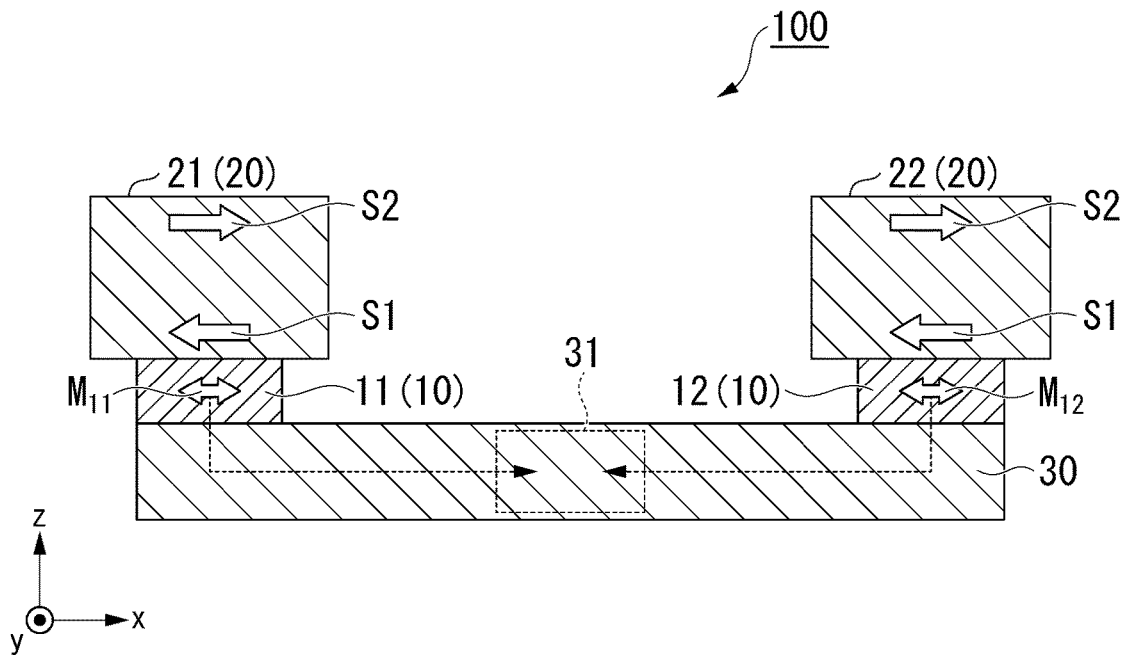
FIG. 3 is a view for describing an operation of the reservoir element according to the first embodiment.

FIG. 3 is a view for describing an operation of the reservoir element 100. When the current I flows to the spin-orbit torque wiring 20, a first spin S1 and a second spin S2 move in the z-direction due to the spin Hall effect. For example, the first spin S1 moves in the −z-direction, and the second spin S2 moves in the +z-direction. The first spin S1 accumulated on an interface between the ferromagnetic layers 10 and the spin transport layer 30 is injected into the ferromagnetic layers 10, and a spin-orbit torque is applied to magnetizations $M_{11}$ and $M_{12}$.

The direction (the +z-direction or the −z-direction) in which the first spin S1 and the second spin S2 move is changed according to an orientation of the current I flowing through the spin-orbit torque wiring 20. When the high-frequency current is applied to the spin-orbit torque wiring 20, the orientation of the spins injected into the ferromagnetic layers 10 is changed, and the magnetizations $M_{11}$ and $M_{12}$ are oscillated. In addition, the magnetizations $M_{11}$ and $M_{12}$ can be oscillated by adjusting the current flowing through the spin-orbit torque wiring 20.

The spin currents reach the spin transport layer 30 from the first ferromagnetic layer 11 and the second ferromagnetic layer 12. Since the magnetizations $M_{11}$ and $M_{12}$ are oscillated, the spin currents also show oscillation corresponding to the magnetizations $M_{11}$ and $M_{12}$. The spins accumulated on the interface between the first ferromagnetic layer 11 or the second ferromagnetic layer 12 and the spin transport layer 30 propagate in the spin transport layer 30 as the spin currents.

The spin current from which the magnetization $M_{11}$ of the first ferromagnetic layer 11 is created and the spin current from which the magnetization $M_{12}$ of the second ferromagnetic layer 12 is created interfere with a merging region 31 in the spin transport layer 30. The merging region 31 is located between the first ferromagnetic layer 11 and the second ferromagnetic layer 12 in the spin transport layer 30. The interference between the spin currents affects the oscillations of the magnetizations $M_{11}$ and $M_{12}$, and the oscillations of the magnetization $M_{11}$ of the first ferromagnetic layer 11 and the oscillations of the magnetization $M_{12}$ of the second ferromagnetic layer 12 resonate with each other. A frequency of the oscillation of the magnetization $M_{11}$ and a frequency of the oscillation of the magnetization $M_{12}$ coincide with each other due to the resonance. A phase of the oscillation of the magnetization $M_{11}$ and a phase of the oscillation of the magnetization $M_{12}$ are synchronized with each other or are deviated from each other by a half-wave length ($\pi$).

Figure 4:
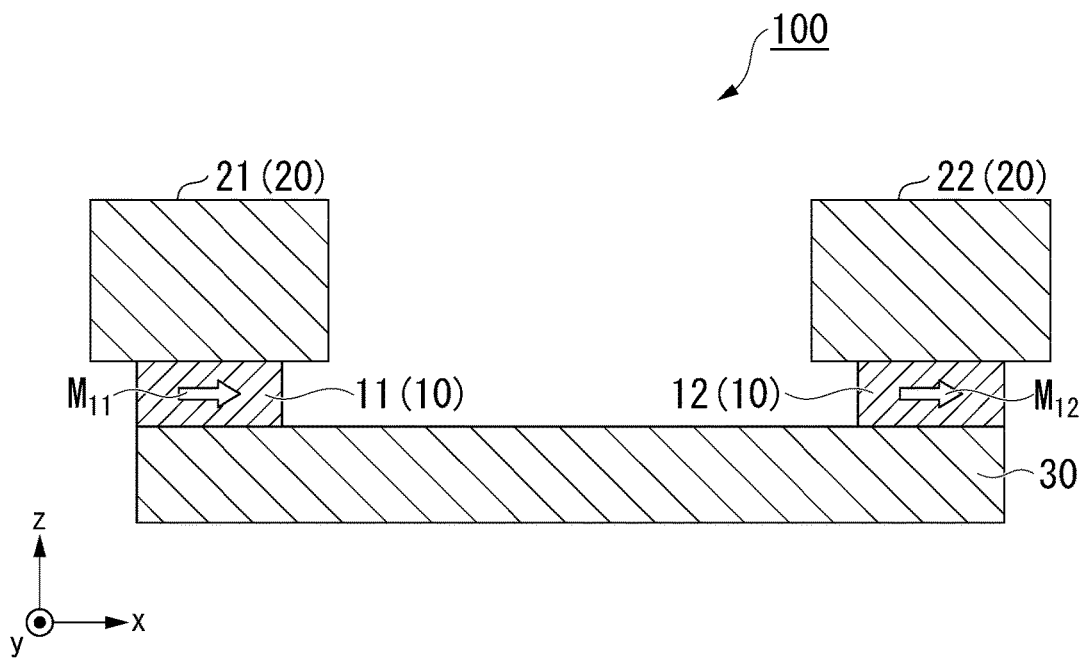
FIG. 4 is a view showing a relationship of magnetization when two phases of oscillation of the magnetization are synchronized.
Figure 5:
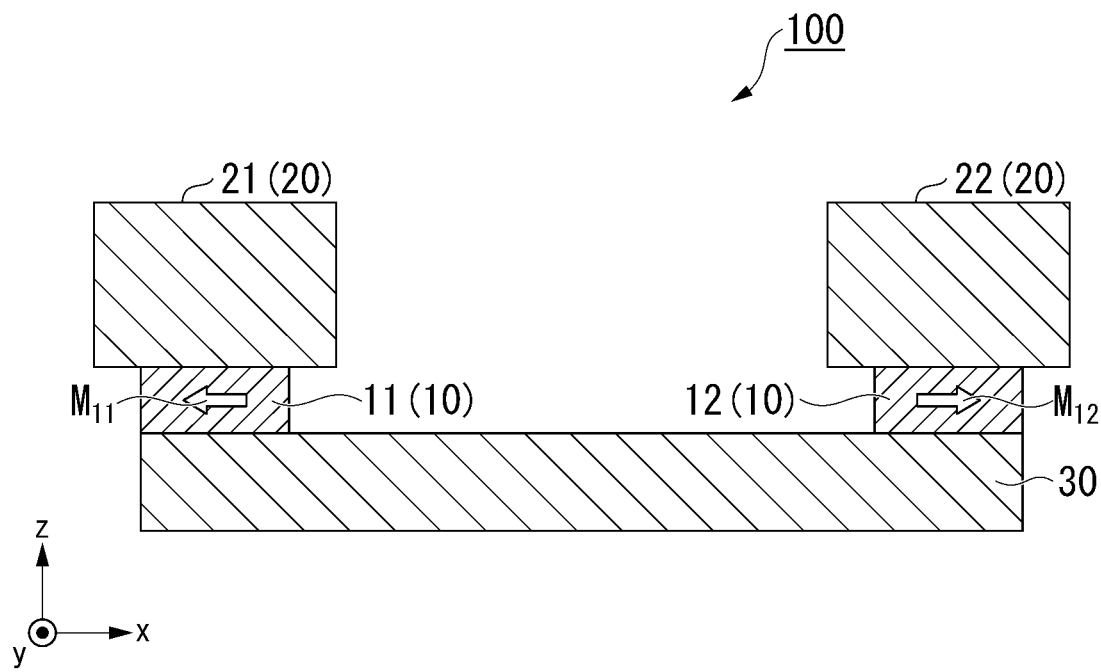
FIG. 5 is a view showing a relationship of magnetization when the two phases of the oscillation of the magnetization deviate from each other by half a wavelength ($\pi$).

When application of the current I to the spin-orbit torque wiring 20 is stopped, the oscillations of the magnetizations $M_{11}$ and $M_{12}$ are stopped. FIGS. 4 and 5 show a relationship between the magnetizations $M_{11}$ and $M_{12}$ after resonance. FIG. 4 shows a relationship between the magnetizations $M_{11}$ and $M_{12}$ when the phase of the oscillations of the magnetizations $M_{11}$ and the phase of the oscillations of magnetization $M_{12}$ are synchronized with each other. When the two phases of the oscillation are synchronized with each other, the orientation of the magnetization $M_{11}$ and the orientation of the magnetization $M_{12}$ are aligned (hereinafter, referred to "parallel"). On the other hand, FIG. 5 shows a relationship between the magnetizations $M_{11}$ and $M_{12}$ when the phase of the oscillation of the magnetization $M_{11}$ and the phase of the oscillation of the magnetization $M_{12}$ are deviated from each other by a half-wave length ($\pi$). When the two phases of the oscillations are deviated from each other by a half-wave length ($\pi$), the orientation of the magnetization $M_{11}$ and the orientation of the magnetization $M_{12}$ are opposite (hereinafter, referred to as "anti-parallel").

Next, a signal is output from the reservoir element 100 to the output part 120. The signal is output as a resistance value of the reservoir element 100. The resistance value of the reservoir element 100 is a resistance value when direct current flows in sequence of the first spin-orbit torque wiring 21, the first ferromagnetic layer 11, the spin transport layer 30, the second ferromagnetic layer 12, the second spin-orbit torque wiring 22. When the magnetization $M_{11}$ and the magnetization $M_{12}$ are parallel to each other, the resistance value of the reservoir element 100 is reduced in comparison with the case in which the magnetization $M_{11}$ and the magnetization $M_{12}$ are anti-parallel to each other. In the reservoir element 100, for example, information of "1" when the resistance value of the reservoir element 100 is large (the magnetization $M_{11}$ and the magnetization $M_{12}$ are anti-parallel to each other) and "0" when the resistance value of the reservoir element 100 is small (the magnetization $M_{11}$ and the magnetization $M_{12}$ are parallel to each other) are transmitted to the output part 120.

The current I input to the spin-orbit torque wiring 20 has various pieces of information, which are, for example, a frequency, a current density, an amount of current, and the like, of the current I. Meanwhile, the reservoir element 100 outputs the information of "1" and "0" as the resistance values. That is, the reservoir element 100 according to the first embodiment compresses the information by converting the oscillations of the magnetizations $M_{11}$ and $M_{12}$ of the plurality of first ferromagnetic layers 10 into the spin currents and interfering with each other in the spin transport layer 30.

The compressed signal is transmitted to the output part 120. The output part 120 weights the signal read from the reservoir element 100 through learning.

As described above, the reservoir element 100 according to the first embodiment compresses the information by converting the oscillations of the magnetization $M_{11}$ and $M_{12}$ of the plurality of ferromagnetic layers 10 into the spin currents and causing the spin currents to interfere with each other in the spin transport layer 30. When the signals are compressed by the reservoir element 100, only the output part 120 needs to be learned, and the power consumption of the neuromorphic element 200 is reduced.

Second Embodiment

Figure 6:
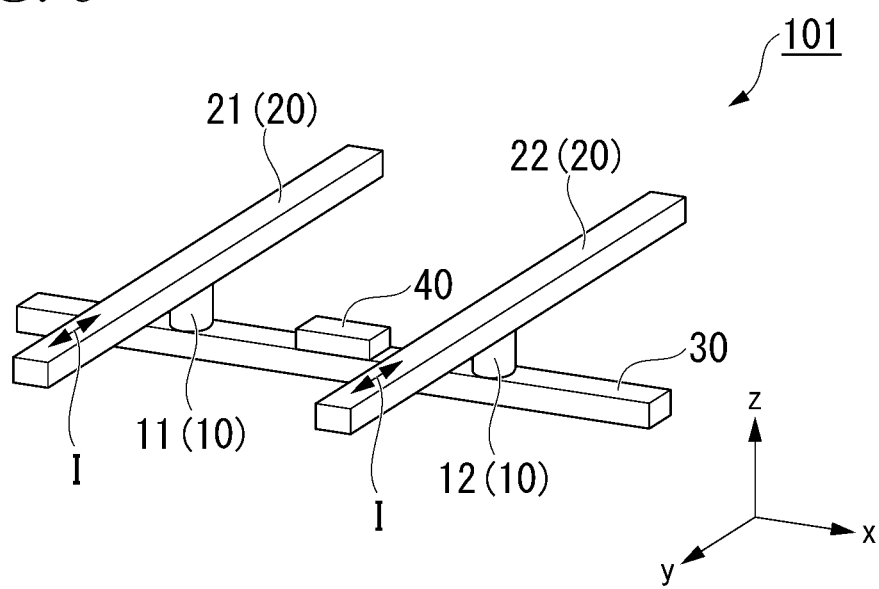
FIG. 6 is a perspective view of a reservoir element according to a second embodiment.

FIG. 6 is a perspective view of a reservoir element 101 according to a second embodiment. The reservoir element 101 is distinguished from the reservoir element 100 shown in FIG. 2 in that a gate electrode 40 is provided. The other configurations are the same as in the first embodiment and designated by the same reference signs. Description of the same configurations will be omitted.

The gate electrode 40 faces the spin transport layer 30. The gate electrode 40 is located between the first ferromagnetic layer 11 and the second ferromagnetic layer 12 when seen in a plan view from the z-direction.

The gate electrode 40 includes a known electrode material. When the spin transport layer 30 is formed of a metal or an alloy, an insulating layer is preferably provided between the gate electrode 40 and the spin transport layer 30.

The gate electrode 40 applies a voltage to the spin transport layer 30. When the voltage is applied to the gate electrode 40, the ease of transport of the spins in the spin transport layer 30 is changed. For this reason, an interference condition between the spin current from which the magnetization $M_{11}$ of the first ferromagnetic layer 11 is created and the spin current from which the magnetization $M_{12}$ of the second ferromagnetic layer 12 is created (for example, a position at which the spin currents interfere with each other (a position of the merging region 31) or the like) is changed. When the interference condition between the spin currents is changed, a probability that the phase of the oscillation of the magnetization $M_{11}$ and the phase of the oscillation of the magnetization $M_{12}$ are synchronized with each other and a probability that they are deviated from each other by a half-wave length ($\pi$) are fluctuated. That is, the gate electrode 40 can change a compression condition of information in the reservoir element 101.

As described above, the reservoir element 101 according to the second embodiment can compress the information by converting the oscillations of the magnetizations $M_{11}$ and $M_{12}$ of the plurality of ferromagnetic layers 10 into the spin currents, and causing the spin currents to interfere with each other in the spin transport layer 30. In addition, the compression condition of the information can be changed by the gate electrode 40.

Third Embodiment

Figure 7:
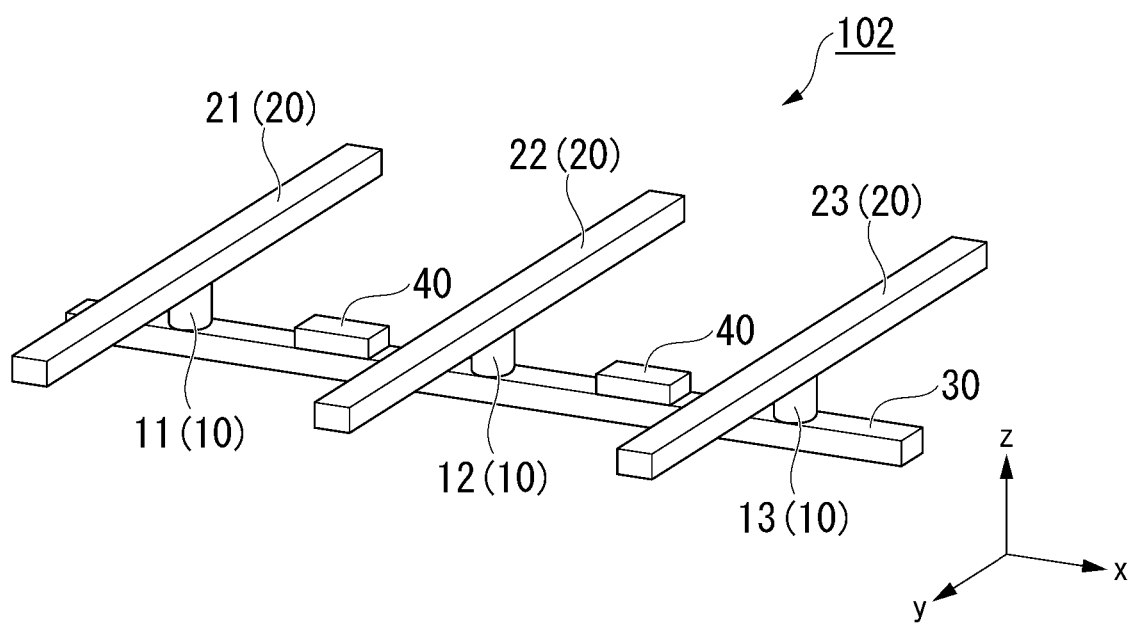
FIG. 7 is a perspective view of a reservoir element according to a third embodiment.

FIG. 7 is a perspective view of a reservoir element 102 according to a third embodiment. The reservoir element 102 is distinguished from the reservoir element 101 according to the second embodiment in that the number of ferromagnetic layers 10 and the number of spin-orbit torque wirings 20 are different from those in the second embodiment. The other configurations are the same as in the second embodiment and designated by the same reference signs. Description of the same configurations will be omitted.

The reservoir element 102 has the plurality of ferromagnetic layers 10, the plurality of spin-orbit torque wirings 20, the spin transport layer 30 and the plurality of gate electrodes 40.

The plurality of ferromagnetic layers 10 include, for example, a first ferromagnetic layer 11, a second ferromagnetic layer 12 and a third ferromagnetic layer 13. The first ferromagnetic layer 11, the second ferromagnetic layer 12 and the third ferromagnetic layer 13 are arranged one-dimensionally in the x-direction.

The plurality of spin-orbit torque wirings 20 include, for example, a first spin-orbit torque wiring 21, a second spin-orbit torque wiring 22 and a third spin-orbit torque wiring 23. The plurality of spin-orbit torque wirings 20 are provided on the plurality of ferromagnetic layers 10, respectively. That is, the first spin-orbit torque wiring 21 is connected to the first ferromagnetic layer 11, the second spin-orbit torque wiring 22 is connected to the second ferromagnetic layer 12, and the third spin-orbit torque wiring 23 is connected to the third ferromagnetic layer 13.

The spin transport layer 30 extends in the x-direction. The spin transport layer 30 faces the plurality of ferromagnetic layers 10. The spin transport layer 30 connects the first ferromagnetic layer 11, the second ferromagnetic layer 12 and the third ferromagnetic layer 13.

The gate electrode 40 faces the spin transport layer 30. The gate electrode 40 is located between the first ferromagnetic layer 11 and the second ferromagnetic layer 12 and between the second ferromagnetic layer 12 and the third ferromagnetic layer 13 when seen in a plan view from the z-direction.

The oscillation of the magnetization of the first ferromagnetic layer 11 and the oscillation of the magnetization of the second ferromagnetic layer 12 are converted into the spin currents and interfere with each other in the spin transport layer 30. The oscillation of the magnetization of the second ferromagnetic layer 12 and the oscillation of the magnetization of the third ferromagnetic layer 13 are converted into the spin currents and interfere with each other in the spin transport layer 30. In addition, when a distance between the first ferromagnetic layer 11 and the third ferromagnetic layer 13 is short, the oscillation of the magnetization of the first ferromagnetic layer 11 and the oscillation of the magnetization of the third ferromagnetic layer 13 are converted into the spin currents, and the spin currents interfere with each other in the spin transport layer 30.

For example, the phase of the oscillation of magnetization of the first ferromagnetic layer 11 and the phase of the oscillation of the magnetization of the second ferromagnetic layer 12 are synchronized with each other, and the phase of the oscillation of the magnetization of the second ferromagnetic layer 12 and the phase of the oscillation of the magnetization of the third ferromagnetic layer 13 are deviated from each other by a half-wave length ($\pi$). When application of the current I to each of the spin-orbit torque wirings 20 is stopped, the magnetization of the first ferromagnetic layer 11 and the magnetization of the second ferromagnetic layer 12 are parallel to each other, and the magnetization of the second ferromagnetic layer 12 and the magnetization of the third ferromagnetic layer 13 are anti-parallel to each other. In addition, the magnetization of the first ferromagnetic layer 11 and the magnetization of the third ferromagnetic layer 13 are anti-parallel to each other.

When the direct current is applied between the first ferromagnetic layer 11 and the second ferromagnetic layer 12, a signal of "0" is output. In addition, when the direct current is applied between the second ferromagnetic layer 12 and the third ferromagnetic layer 13 or between the first ferromagnetic layer 11 and the third ferromagnetic layer 13, a signal of "1" is output.

As described above, the reservoir element 102 according to the third embodiment can compress the information by converting the oscillations of the plurality of ferromagnetic layers 10 into the spin currents and causing the spin currents to interfere with each other in the spin transport layer 30. In addition, since the number of ferromagnetic layers 10 is increased, interference between the signals from the ferromagnetic layers 10 is complicated. Accordingly, the reservoir element 102 according to the third embodiment allows for more complex information processing.

Further, in the reservoir element 102 shown in FIG. 7, while three ferromagnetic layers 10 has been exemplarily shown, four or more ferromagnetic layers 10 may be arranged in the x-direction.

Fourth Embodiment

Figure 8:
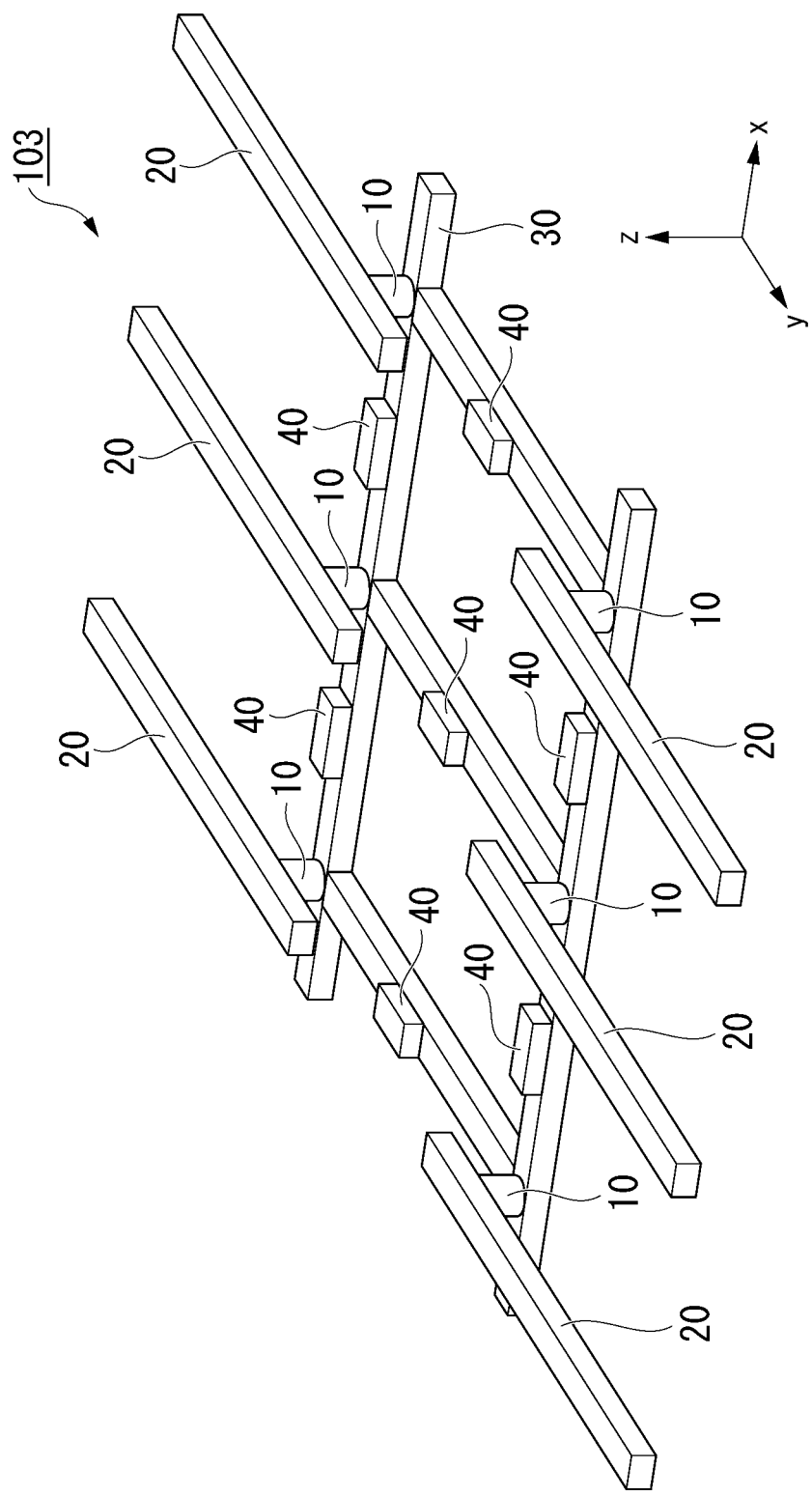
FIG. 8 is a perspective view of a reservoir element according to a fourth embodiment.

FIG. 8 is a perspective view of a reservoir element 103 according to a fourth embodiment. In the reservoir element 103, the number and disposition of ferromagnetic layers 10, the number of spin-orbit torque wirings 20, a shape of the spin transport layer 30 and the number of gate electrodes 40 are different from those of the reservoir element 101 according to the second embodiment. The other configurations are the same as in the second embodiment and designated by the same reference signs. Description of the same configurations will be omitted.

The reservoir element 103 has the plurality of ferromagnetic layers 10, the plurality of spin-orbit torque wirings 20, the spin transport layer 30 and the plurality of gate electrodes 40.

The plurality of ferromagnetic layers 10 are arranged two-dimensionally in the x-y plane perpendicular to the z-direction. In the specification, "arranged two-dimensionally" means that the plurality of ferromagnetic layers 10 are present on the same surface, and separate ferromagnetic layers are present on a line intersecting a straight line that connects arbitrary two ferromagnetic layers. For example, when the plurality of ferromagnetic layers 10 are arranged in a square lattice shape or a hexagonal lattice shape when seen in a plan view from the z-direction, it can be said that the plurality of ferromagnetic layers 10 are "arranged two-dimensionally."

The plurality of spin-orbit torque wirings 20 are provided on the plurality of ferromagnetic layers 10, respectively.

The spin transport layer 30 has portions extending in the x-direction and portions extending in the y-direction, which form a lattice. For example, the plurality of ferromagnetic layers 10 are located at positions of intersections of the lattice of the spin transport layer 30. The spin transport layer 30 connects the two ferromagnetic layers 10, which are closest to each other, of the plurality of ferromagnetic layers 10.

The gate electrode 40 faces the spin transport layer 30. The gate electrode 40 is located between the neighboring ferromagnetic layers 10 when seen in a plan view from the z-direction.

The oscillations of the magnetizations of the neighboring ferromagnetic layers 10 are converted into the spin currents, and the spin currents interfere with each other in the spin transport layer 30.

As described above, the reservoir element 103 according to the fourth embodiment can compress the information by converting the oscillations of the plurality of ferromagnetic layers 10 into the spin currents and causing the spin currents to interfere with each other in the spin transport layer 30. In addition, since the number of the ferromagnetic layers 10 is increased, interference between the signals from the ferromagnetic layers 10 is complicated. Accordingly, the reservoir element 103 according to the fourth embodiment can perform more complicate information processing.

Further, in the reservoir element 103 shown in FIG. 8, while the example in which the ferromagnetic layers 10 are located in two rows and three columns has been shown, disposition is not limited thereto.

Fifth Embodiment

Figure 9:
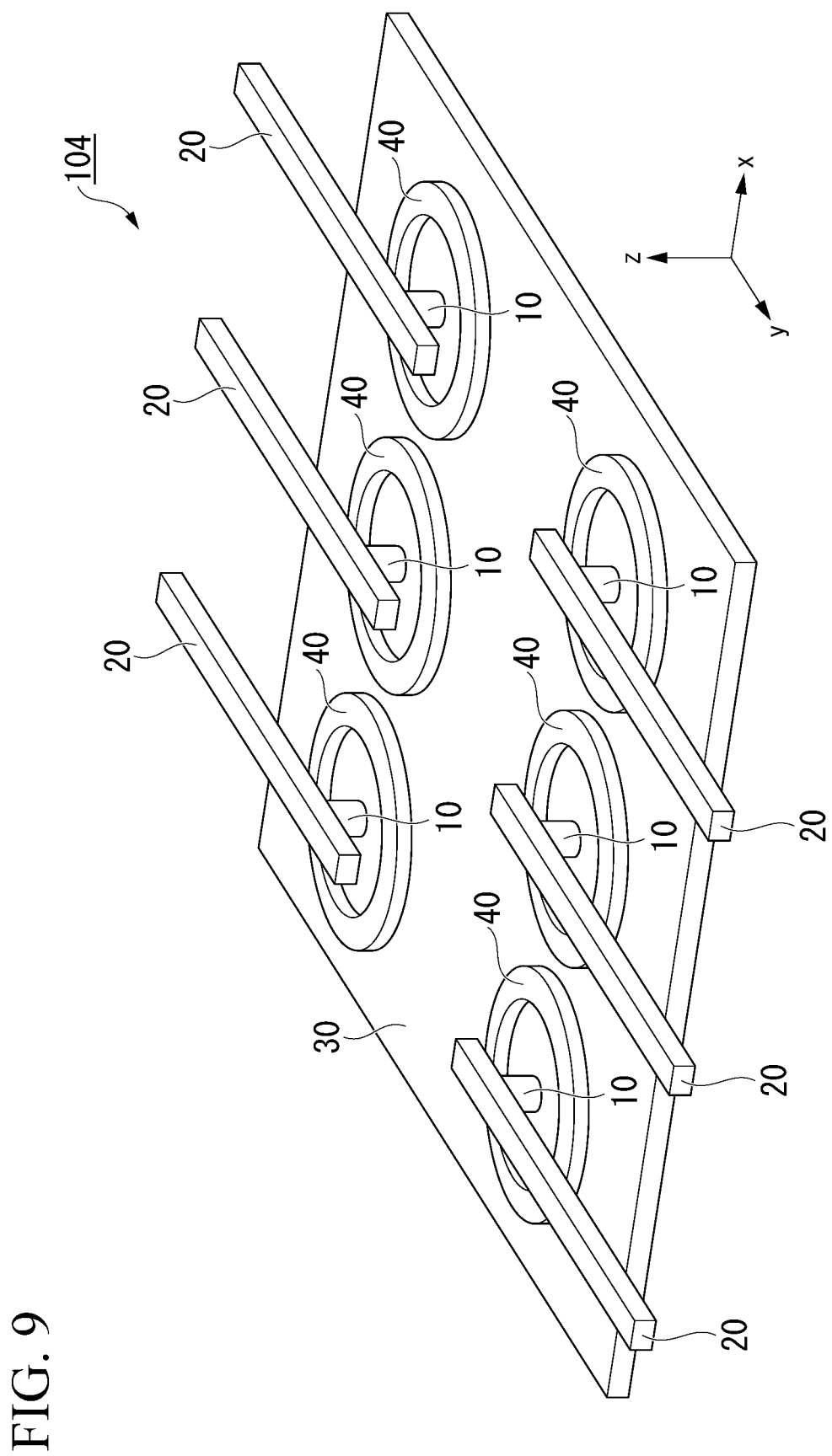
FIG. 9 is a perspective view of a reservoir element according to a fifth embodiment.

FIG. 9 is a perspective view of a reservoir element 104 according to a fifth embodiment. In the reservoir element 104, a shape of the spin transport layer 30 and a shape of the gate electrode 40 are different from those of the reservoir element 103 according to the fourth embodiment. The other configurations are the same as in the fourth embodiment and designated by the same reference signs. Description of the same configurations will be omitted.

The spin transport layer 30 is a plane extending in the x-y-direction. The spin transport layer 30 connects the plurality of ferromagnetic layers 10.

The gate electrode 40 faces the spin transport layer 30. The gate electrode 40 has an annular shape that surrounds surroundings of the ferromagnetic layers 10.

As described above, the reservoir element 104 according to the fifth embodiment can compress the information by converting the oscillations of the plurality of ferromagnetic layers 10 into the spin currents and causing the spin current to interfere with each other in the spin transport layer 30. In addition, since the spin transport layer 30 is a plane, interference between the ferromagnetic layers 10 other than the neighboring ferromagnetic layers 10 becomes easier.

Further, in the reservoir element 104 shown in FIG. 9, while the example in which the ferromagnetic layers 10 are located in two rows and three columns has been shown, disposition is not limited thereto.

Sixth Embodiment

Figure 10:
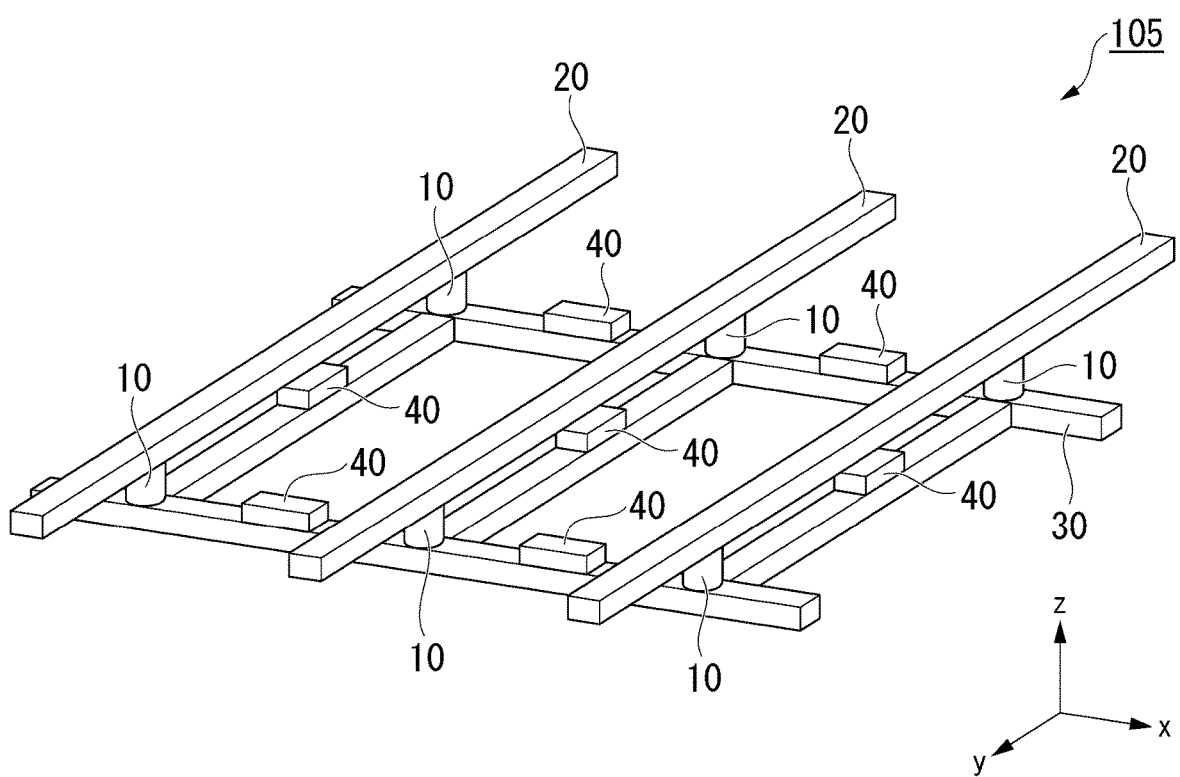
FIG. 10 is a perspective view of a reservoir element according to a sixth embodiment.

FIG. 10 is a perspective view of a reservoir element 105 according to a sixth embodiment. The reservoir element 105 is distinguished from the reservoir element 103 according to the fourth embodiment in that the spin-orbit torque wiring 20 is connected to the plurality of ferromagnetic layers 10. The other configurations are the same as in the fourth embodiment and designated by the same reference signs. Description of the same configurations will be omitted.

The spin-orbit torque wiring 20 is connected to two or more ferromagnetic layers 10 of the plurality of ferromagnetic layers 10. The spin-orbit torque wiring 20 injects spins into the ferromagnetic layers 10 and applies a spin-orbit torque to the magnetizations of the ferromagnetic layers 10. The same spin-orbit torque is applied to the ferromagnetic layers 10 connected to the same spin-orbit torque wiring 20. Accordingly, the ferromagnetic layers 10 connected to the same spin-orbit torque wiring 20 are easily resonated.

As described above, the reservoir element 105 according to the sixth embodiment can compress the information by converting the oscillations of the plurality of ferromagnetic layers 10 into the spin currents and causing the spin currents to interfere with each other in the spin transport layer 30. In addition, since the spin-orbit torque wiring 20 is connected to the plurality of ferromagnetic layers 10, the ferromagnetic layers 10 connected to the same spin-orbit torque wiring 20 can easily interfere with each other.

Seventh Embodiment

Figure 11:
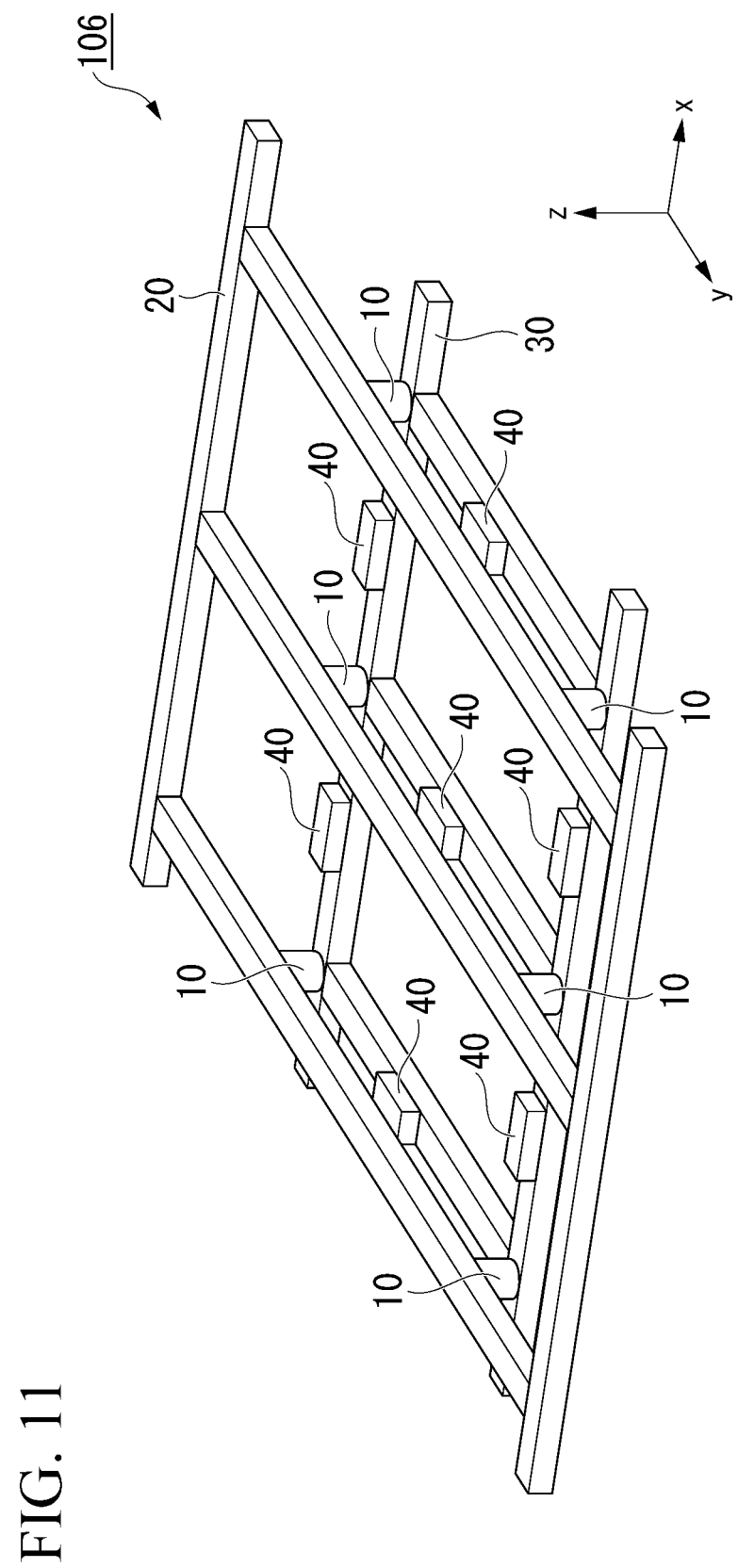
FIG. 11 is a perspective view of a reservoir element according to a seventh embodiment.

FIG. 11 is a perspective view of a reservoir element 106 according to a seventh embodiment. The reservoir element 106 is distinguished from the reservoir element 103 according to the fourth embodiment in that the spin-orbit torque wiring 20 is connected to the plurality of ferromagnetic layers 10. The other configurations are the same as in the fourth embodiment and designated by the same reference signs. Description of the same configurations will be omitted.

The spin-orbit torque wiring 20 has portions extending in the x-direction and portions extending in the y-direction, which form a lattice. When the direction of the current flowing through the spin-orbit torque wiring 20 and the lamination direction (the z-direction) of the ferromagnetic layers 10 cross each other, the spins are injected into the ferromagnetic layers 10. Since the spin-orbit torque wiring 20 forms the lattice, the direction of the current flowing through the spin-orbit torque wiring 20 and the lamination direction of the ferromagnetic layers 10 cross each other.

The spin-orbit torque wiring 20 is connected to all of the plurality of ferromagnetic layers 10. The same spin-orbit torque is applied to all of the ferromagnetic layers 10. Accordingly, frequencies of the oscillations of the ferromagnetic layers 10 coincide with each other, and the ferromagnetic layers 10 are easily resonated.

As described above, the reservoir element 106 according to the seventh embodiment can compress the information by converting the oscillations of the plurality of ferromagnetic layers 10 into the spin currents and causing the spin currents to interfere with each other in the spin transport layer 30. In addition, since the spin-orbit torque wiring 20 is connected to the plurality of ferromagnetic layers 10, the ferromagnetic layers 10 connected to the same spin-orbit torque wiring 20 can easily interfere with each other.

Eighth Embodiment

Figure 12:
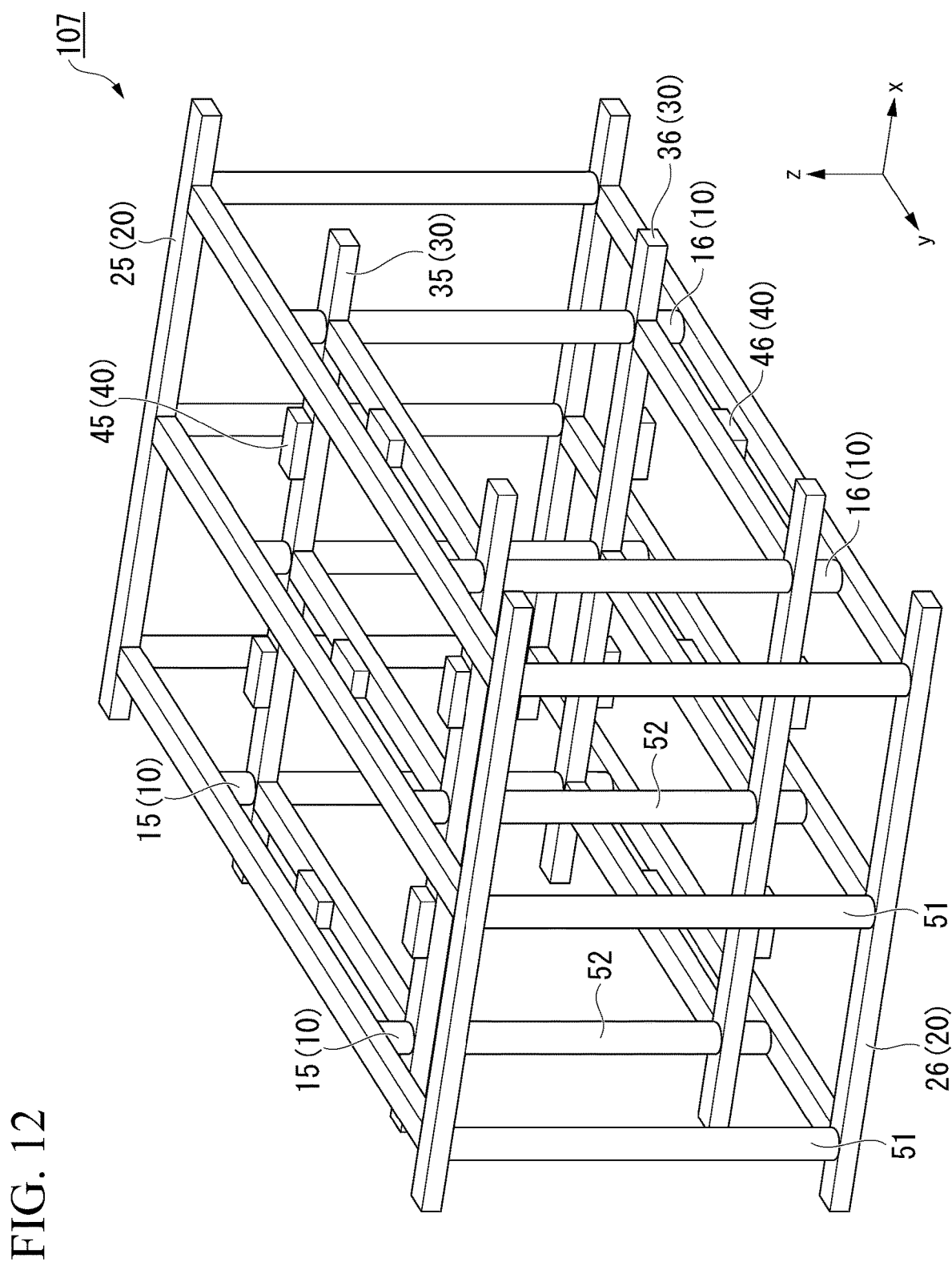
FIG. 12 is a perspective view of a reservoir element according to an eighth embodiment.

FIG. 12 is a perspective view of a reservoir element 107 according to an eighth embodiment. The reservoir element 107 is distinguished from the reservoir element 106 according to the seventh embodiment in that the spin-orbit torque wiring 20, the ferromagnetic layers 10, the spin transport layer 30 and gate electrodes are arranged three-dimensionally. The other configurations are the same as in the seventh embodiment and designated by the same reference signs. Description of the same configurations will be omitted.

The reservoir element 107 has the plurality of ferromagnetic layers 10, the plurality of spin-orbit torque wirings 20, the plurality of spin transport layers 30, the plurality of gate electrodes 40, a plurality of via wirings 51 and a plurality of spin via wirings 52.

The plurality of ferromagnetic layers 10 have a plurality of ferromagnetic layers 15 located at a first height position, and a plurality of ferromagnetic layers 16 located at a second height position. The height position shows a position in the z-direction. The plurality of ferromagnetic layers 15 are located on an x-y plane having the same height. The plurality of ferromagnetic layers 16 are located on the x-y plane having the same height.

The plurality of spin transport layers 30 have a first spin transport layer 35 and a second spin transport layer 36. The first spin transport layer 35 faces the plurality of ferromagnetic layers 15 located at the first height position. The second spin transport layer 36 faces the plurality of ferromagnetic layers 16 located at the second height position. The first spin transport layer 35 and the second spin transport layer 36 are located at different height positions.

The plurality of spin-orbit torque wirings 20 have a first spin-orbit torque wiring 25 and a second spin-orbit torque wiring 26. The first spin-orbit torque wiring 25 faces the plurality of ferromagnetic layers 15 located at the first height position. The second spin-orbit torque wiring 26 faces the plurality of ferromagnetic layers 16 located at the second height position. The first spin-orbit torque wiring 25 and the second spin-orbit torque wiring 26 are located at different height positions.

The plurality of gate electrodes 40 have a first gate electrode 45 and a second gate electrode 46. The first gate electrode 45 faces the first spin transport layer 35. The second gate electrode 46 faces the second spin transport layer 36. The first gate electrode 45 faces, for example, a +z surface of the first spin transport layer 35, and the second gate electrode 46 faces, for example, a −z surface of the second spin transport layer 36.

The plurality of via wirings 51 connect the first spin-orbit torque wiring 25 and the second spin-orbit torque wiring 26. The same current flows to the first spin-orbit torque wiring 25 and the second spin-orbit torque wiring 26 through the plurality of via wirings 51. The via wirings 51 are formed of the same material as that of the spin-orbit torque wiring.

The plurality of spin via wirings 52 connect the first spin transport layer 35 and the second spin transport layer 36. The spin via wirings 52 transport spins. The spin via wirings 52 are formed of the same material as that of the spin transport layer. The ferromagnetic layers 15 and 16 located at the different height positions interfere with each other through the spin via wirings 52.

As described above, the reservoir element 107 according to the eighth embodiment can compress the information by converting the oscillations of the plurality of ferromagnetic layers 10 into the spin currents and causing the spin currents to interfere with each other in the spin transport layer 30. In addition, since the reservoir element 107 has a three-dimensional structure, it is possible to further increase agglomeration of the ferromagnetic layers 10.

Further, while the example in which the reservoir element 107 shown in FIG. 12 has the ferromagnetic layers 10 located at different height positions to form two layers has been shown, the ferromagnetic layers 10 may be located at two or more different height positions.

Hereinabove, while the examples of the preferred embodiments of the present invention have been described in detail, the present invention is not limited to the embodiments and various modifications and changes may be made without departing from the scope of the present invention disclosed in the claims.

REFERENCE SIGNS LIST 10, 15, 16 Ferromagnetic layer
11 First ferromagnetic layer
12 Second ferromagnetic layer
13 Third ferromagnetic layer
20 Spin-orbit torque wiring
21, 25 First spin-orbit torque wiring
22, 26 Second spin-orbit torque wiring
23 Third spin-orbit torque wiring
30 Spin transport layer
35 First spin transport layer
36 Second spin transport layer
31 Merging region
40 Gate electrode
45 First gate electrode
46 Second gate electrode
100, 101, 102, 103, 104, 105, 106, 107 Reservoir element
110 Input part
120 Output part
200 Neuromorphic element
A Agglomerate
Cp Chip
$M_{11}$, $M_{12}$ Magnetization

What is claimed is:

1. A reservoir element comprising:
a plurality of ferromagnetic layers laminated in a first direction and separated from each other;
at least one spin-orbit torque wiring that faces at least one of the plurality of ferromagnetic layers;
a spin transport layer that faces the plurality of ferromagnetic layers, connects at least the two ferromagnetic layers closest to each other among the plurality of ferromagnetic layers and transports spins; and
a gate electrode facing the spin transport layer and located between the plurality of ferromagnetic layers,
wherein the plurality of ferromagnetic layers are located in a two-dimensional array on a first surface intersecting the first direction.

2. A reservoir element comprising:
a plurality of ferromagnetic layers laminated in a first direction and separated from each other;
at least one spin-orbit torque wiring that faces at least one of the plurality of ferromagnetic layers;
a spin transport layer that faces the plurality of ferromagnetic layers, connects at least the two ferromagnetic layers closest to each other among the plurality of ferromagnetic layers and transports spins; and
a gate electrode facing the spin transport layer and located between the plurality of ferromagnetic layers,
wherein a plurality of spin transport layers are provided,
a first spin transport layer faces a ferromagnetic layer located at a first height position in the first direction,
a second spin transport layer faces a ferromagnetic layer located at a second height position in the first direction, and
the first spin transport layer and the second spin transport layer are connected to each other via a spin via wiring that transports spins.

3. A reservoir element comprising:
a plurality of ferromagnetic layers laminated in a first direction and separated from each other;
at least one spin-orbit torque wiring that faces at least one of the plurality of ferromagnetic layers; and
a spin transport layer that faces the plurality of ferromagnetic layers, connects at least the two ferromagnetic layers closest to each other among the plurality of ferromagnetic layers and transports spins, wherein
the at least one spin-orbit torque wiring comprises a plurality of spin-orbit torque wirings,
each of the spin-orbit torque wirings is connected to each of the ferromagnetic layers, and the plurality of ferromagnetic layers are located in a two-dimensional array on a first surface intersecting the first direction.

\* \* \* \* \*